United States Patent
Nishibayashi et al.

(10) Patent No.: US 12,449,457 B2
(45) Date of Patent: Oct. 21, 2025

(54) DIAMOND SENSOR UNIT

(71) Applicant: SUMITOMO ELECTRIC INDUSTRIES, LTD., Osaka (JP)

(72) Inventors: Yoshiki Nishibayashi, Osaka (JP); Hiromi Nakanishi, Osaka (JP); Hiroshige Deguchi, Kyoto (JP); Tsukasa Hayashi, Kyoto (JP); Natsuo Tatsumi, Kyoto (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 153 days.

(21) Appl. No.: 18/273,313

(22) PCT Filed: Jan. 26, 2022

(86) PCT No.: PCT/JP2022/002766
§ 371 (c)(1),
(2) Date: Jul. 20, 2023

(87) PCT Pub. No.: WO2022/163679
PCT Pub. Date: Aug. 4, 2022

(65) Prior Publication Data
US 2024/0118327 A1   Apr. 11, 2024

(30) Foreign Application Priority Data
Jan. 27, 2021   (JP) .................................. 2021-010937

(51) Int. Cl.
*G01R 29/08*   (2006.01)
*G01R 1/24*   (2006.01)

(52) U.S. Cl.
CPC .......... *G01R 29/0878* (2013.01); *G01R 1/24* (2013.01)

(58) Field of Classification Search
CPC .......................... G02B 6/12009; G02F 1/2955
See application file for complete search history.

(56) References Cited

U.S. PATENT DOCUMENTS

| | | |
|---|---|---|
| 2009/0085182 A1 | 4/2009 | Yamazaki et al. |
| 2017/0363696 A1 | 12/2017 | Hahn et al. |

(Continued)

FOREIGN PATENT DOCUMENTS

| | | |
|---|---|---|
| JP | 2009-54145 A | 3/2009 |
| JP | 2017-67650 A | 4/2017 |

(Continued)

OTHER PUBLICATIONS

Fedotov, I. V. et al., "Fiber-optic magnetometry with randomly oriented spins", Optics Letters, vol. 39, No. 23, Dec. 1, 2014, pp. 6755-6758.

(Continued)

*Primary Examiner* — Tung X Nguyen
(74) *Attorney, Agent, or Firm* — Renner, Otto, Boisselle & Sklar, LLP

(57) ABSTRACT

A diamond sensor unit includes: a diamond having a color center with electron spin; an excitation light irradiation part that irradiates the diamond with excitation light; a first patch antenna that receives electromagnetic waves; an electromagnetic wave irradiation part that irradiates the diamond with the electromagnetic waves received by the first patch antenna; a detection part that detects radiated light radiated from the color center of the diamond after the diamond is irradiated with the excitation light and the electromagnetic waves; and an optical waveguide that transmits the excitation light and the radiated light.

5 Claims, 9 Drawing Sheets

(56) References Cited

U.S. PATENT DOCUMENTS

| | | | |
|---|---|---|---|
| 2019/0219645 A1* | 7/2019 | Hahn | G01R 33/26 |
| 2019/0285706 A1 | 9/2019 | Sekelsky et al. | |
| 2019/0363432 A1 | 11/2019 | Hayashi et al. | |
| 2020/0057117 A1* | 2/2020 | Nishibayashi | G01R 33/0017 |
| 2020/0064419 A1 | 2/2020 | Barry et al. | |
| 2020/0393522 A1 | 12/2020 | Dai et al. | |

FOREIGN PATENT DOCUMENTS

| | | | |
|---|---|---|---|
| JP | 2017-146158 A | 8/2017 | |
| JP | 2017-523766 A | 8/2017 | |
| JP | 2018-136316 A | 8/2018 | |
| JP | 2019-211271 A | 12/2019 | |
| JP | 2020-8298 A | 1/2020 | |
| JP | 2020-038086 A | 3/2020 | |
| JP | 2021-166343 A | 10/2021 | |
| WO | 2016/014869 A2 | 1/2016 | |
| WO | 2018/147381 A1 | 8/2018 | |
| WO | 2018/155504 A1 | 8/2018 | |

OTHER PUBLICATIONS

Aslam, Nabeel et al., "Single Spin Optically Detected Magnetic Resonance with E-Band Microwave Resonators", Arxiv. org. Cornell University Library, Mar. 13, 2015, 7 pages.

Wijayanto, Yusuf Nur et al., "Millimetre-wave Electro-Optic Modulator with Quasi-Phase-Matching Array of Orthogonal-Gap-Embedded Patch-antennas on Low-k Dielectric Material", 2015 Intl. Conf. on Photonics, Optics and laser technology (Photoptics), vol. 2, Mar. 13, 2015, pp. 5-13.

Zhang, Jixing et al., "Diamond Nitrogen-Vacancy Center Magnetometry: Advances and Challenges", Arxiv. org. Oct. 20, 2020, 17 pages.

Webb, James L. et al., "Nanotesla sensitivity magnetic field sensing using a compact diamond nitrogen-vacancy magnetometer", Applied Physics Letters, (Online), vol. 114, No. 23, Jun. 10, 2019, 6 pages.

Felix M. Stuerner, et al., "Compact integrated magnetometer based on nitrogen-vacancy centres in diamond", Diamond & Related Materials 93 (2019) 59-65.

\* cited by examiner

DIAMOND SENSOR UNIT

TECHNICAL FIELD

The present disclosure relates to a diamond sensor unit. The present application claims the priority based on Japanese Patent Application No. 2021-010937 filed on Jan. 27, 2021. The entire description in this Japanese Patent Application is incorporated herein by reference.

BACKGROUND ART

Sensors that use NV centers of diamonds have been known. In a case of using the NV center of a diamond in combination with a microscope, a configuration as shown in FIG. 1 is adopted, for example. That is, an LED 900 disposed on a substrate 912 emits green light for exciting the NV center of a diamond 904. The emitted light passes through an SPF (Short Pass Filter) 902, and subsequently enters diamond 904 disposed on a substrate 914. Accordingly, electrons at the NV center are brought into an excited state. When the excited electrons return to the original ground state, red fluorescent light is emitted from diamond 904. The fluorescent light is collected by a lens 906, passes through an LPF (Long Pass Filter) 908, and subsequently, is detected by a photodiode 910 disposed on a substrate 916. Diamond 904 is irradiated by microwaves generated by an external device (not shown). Accordingly, a resonant state with a state in a different spin state is achieved, and excitation is made, and thus the intensity of the red fluorescent light from diamond 904 is changed. The change is detected by photodiode 910. Lens 906 may have a lens structure of a high-performance optical microscope, or have a simple lens configuration.

Patent Literature 1 described below discloses a scanning probe microscope that uses the NV center of a diamond (i.e., a frequency modulation atomic force microscope (FM-AFM)). Patent Literature 2 described below discloses a magnetic field detection device that uses the NV center of a diamond. Non Patent Literature 1 described below discloses a compact magnetic field detection device that includes a lens.

CITATION LIST

Patent Literature

PTL 1: Japanese Patent Laying-Open No. 2017-67650
PTL 2: Japanese Patent Laying-Open No. 2018-136316

Non Patent Literature

NPL 1: Felix M. Stuerner, et al., "Compact integrated magnetometer based on nitrogen-vacancy centres in diamond", Diamond & Related Materials 93 (2019) 59-65

SUMMARY OF INVENTION

A diamond sensor unit according to an aspect of the present disclosure includes: a diamond having a color center with electron spin; an excitation light irradiation part that irradiates the diamond with excitation light; a first patch antenna that receives electromagnetic waves; an electromagnetic wave irradiation part that irradiates the diamond with the electromagnetic waves received by the first patch antenna; a detection part that detects radiated light radiated from the color center of the diamond after the diamond is irradiated with the excitation light and the electromagnetic waves; and an optical waveguide that transmits the excitation light and the radiated light.

DETAILED DESCRIPTION

Figure 1:
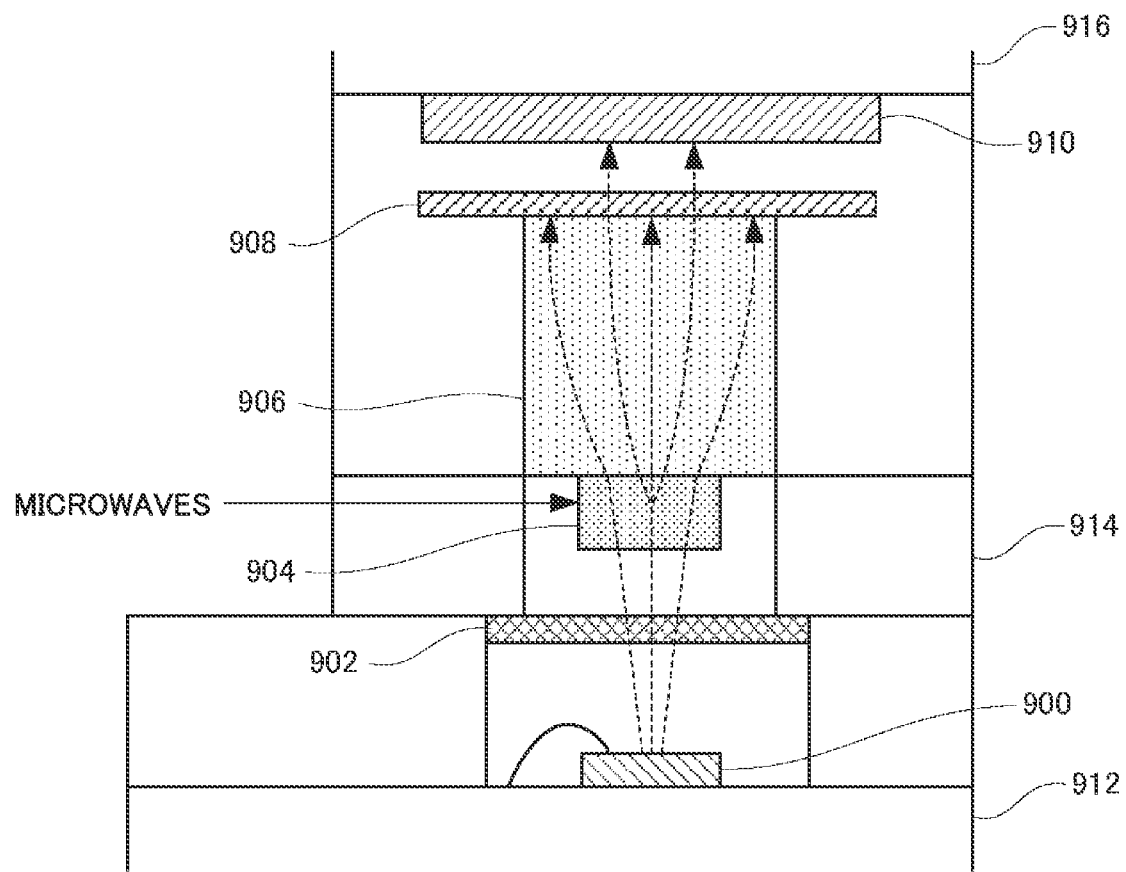
FIG. 1 is a sectional view showing a conventional microscope that uses the NV center of a diamond.

Problem to be Solved by the Present Disclosure

In a case of using a sensor for high-voltage equipment, such as power equipment, a light emitting element and a light receiving element are possibly damaged owing to a high voltage and high current instantaneously caused by electrical discharge and strong electromagnetic waves generated accordingly. The configuration disclosed in Patent Literature 1 cannot be adopted for the sensor used in a high-voltage environment.

Patent Literature 2 discloses that a light emitting element and a light receiving element are disposed to be separated from a diamond and a microwave emission coil. Unfortunately, excitation light and emitted fluorescent light are transmitted as parallel light in the air, and the light is diffused. There is thus a limitation on the distance of separation. In particular, the signal intensity of fluorescent light is low, which causes a problem.

Consequently, the present disclosure has an object to provide a diamond sensor unit that can accurately detect a magnetic field and the like even remotely, without being damaged even in a high-voltage environment.

Advantageous Effect of the Present Disclosure

According to the present disclosure, the diamond sensor unit can be provided that can accurately measure a magnetic field, an electric field and the like even remotely, without being damaged even in a high-voltage environment.

Description of Embodiments

The details of embodiments of the present disclosure are listed and described. At least parts of the embodiments described below may be freely combined.

(1) A diamond sensor unit according to a first aspect of the present disclosure includes: a diamond having a color center with electron spin; an excitation light irradiation part that irradiates the diamond with excitation light; a first patch antenna that receives electromagnetic waves; an electromagnetic wave irradiation part that irradiates the diamond with the electromagnetic waves received by the first patch antenna; a detection part that detects radiated light radiated from the color center of the diamond after the diamond is irradiated with the excitation light and the electromagnetic waves; and an optical waveguide that transmits the excitation light and the radiated light. Accordingly, the magnetic field, the electric field and the like can be accurately measured even remotely without damage even in a high-voltage environment. Furthermore, through use of a patch antenna as a receiving antenna for electromagnetic waves, the design flexibility is improved.

(2) The diamond sensor unit can further include a horn antenna or a second patch antenna that transmits the electromagnetic waves to be received by the first patch antenna, wherein the horn antenna can transmit microwaves as the electromagnetic waves, and the second patch antenna can transmit microwaves, millimeter waves, or submillimeter waves as the electromagnetic waves. Accordingly, the electromagnetic waves can be transmitted to the first patch antenna with good directionality, and the detection accuracy can be improved. Electromagnetic waves of a frequency in accordance with the type of color center to be used can be transmitted. Without limitation to the NV center, a sensor that uses the Si-V center, Ge-V center, Sn-V center or the like can be achieved.

(3) The first patch antenna may include a plate-shaped conductive member that receives the electromagnetic waves, and be disposed in an electrical equipment or an electrical wiring that is a detection target, and the first patch antenna may be disposed so that the conductive member is in parallel with an equipotential plane formed by the detection target. Accordingly, during reception of electromagnetic waves through the first patch antenna, influences of the electric field formed by normal operation of the electrical equipment or electrical wiring that is the measurement target can be suppressed. Consequently, the first patch antenna can stably receive the electromagnetic waves.

(4) The equipotential plane may have a curved shape, and the first patch antenna may be disposed so that the conductive member is disposed along the curved shape. Accordingly, during reception of electromagnetic waves through the first patch antenna, influences of the electric field formed by normal operation of the electrical equipment or electrical wiring that is the measurement target can be more suppressed. Consequently, the first patch antenna can more stably receive the electromagnetic waves.

Details of Embodiments of Present Disclosure

In the following embodiments, the same components are respectively assigned with the same reference numerals. Their names and functions are also the same. Consequently, the detail description about them is not repeated.

First Embodiment

Figure 2:
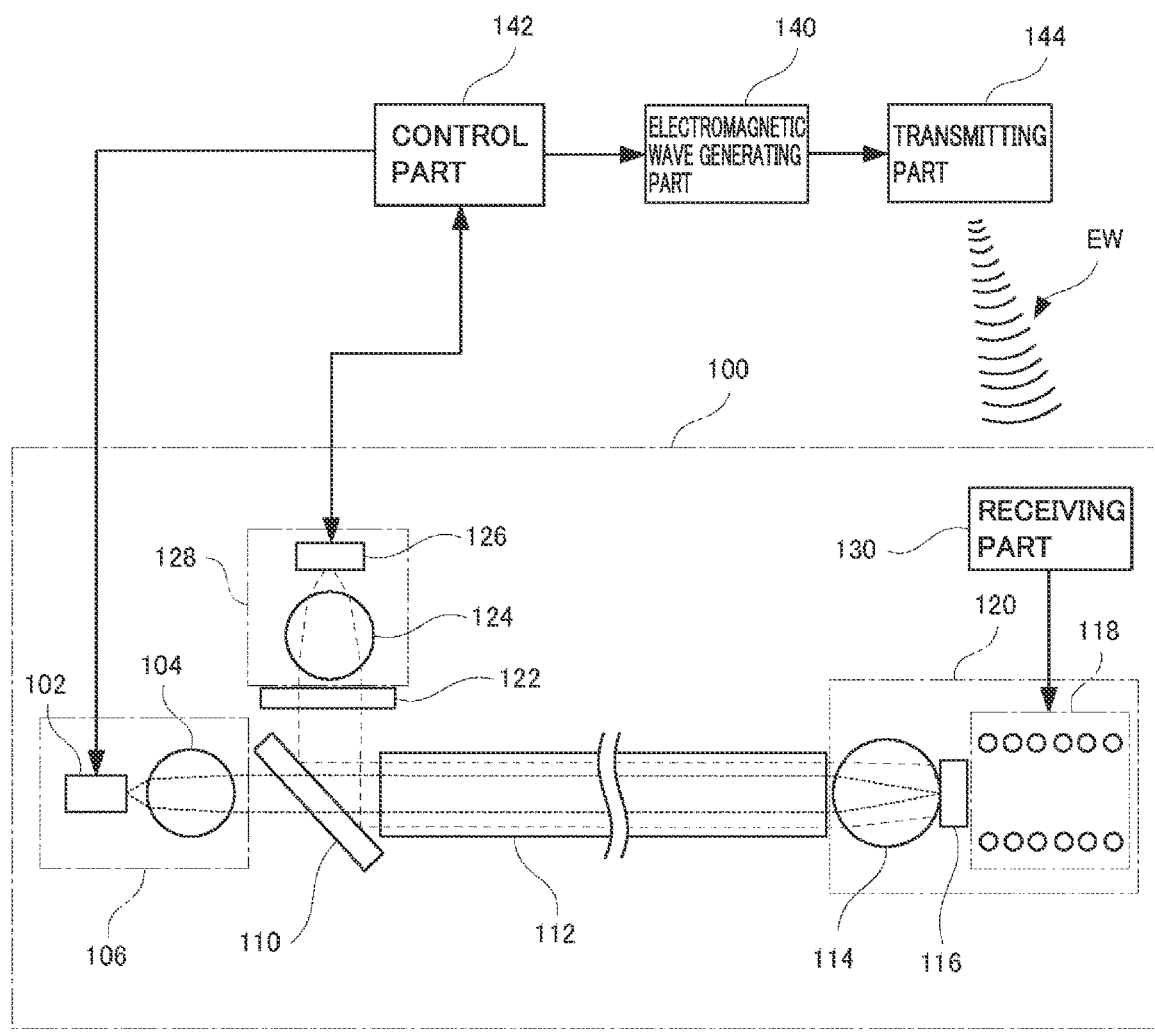
FIG. 2 is a schematic diagram showing a schematic configuration of a diamond sensor unit according to a first embodiment of the present disclosure.

Referring to FIG. 2, a diamond sensor unit 100 according to a first embodiment of the present disclosure includes an excitation light generation part 106, a fluorescent light reflection filter 110, an optical waveguide 112, a sensor part 120, an LPF 122, a light receiving part 128, and receiving part 130. An electromagnetic wave generating part 140, a control part 142, and a transmitting part 144 are disposed outside of the diamond sensor unit 100.

Control part 142 includes a CPU (Central Processing Unit), and a storage part (neither is shown). After-mentioned processes performed by control part 142 are achieved by the CPU reading programs preliminarily stored in the storage part, and executing the programs.

Excitation light generation part 106 includes a light emitting element 102, and a light collecting element 104. Under control by control part 142, light emitting element 102 generates excitation light for exciting a diamond NV⁻ center described later (hereinafter abbreviated as the NV center). For example, control part 142 supplies light emitting element 102 with a voltage for causing light emitting element 102 to emit light at predetermined timing. The excitation light is green light (with a wavelength of about 490 to 560 nm). Preferably, the excitation light is laser light. Preferably, light emitting element 102 is a semiconductor laser (e.g., the wavelength is 532 nm, which is of the radiated light). Light collecting element 104 collects the excitation light output from light emitting element 102. Light collecting element 104 is for inputting the excitation light output from light emitting element 102 in a diffused manner, as much as possible, into an after-mentioned light incident end of optical waveguide 112. Preferably, light collecting element 104 outputs parallel light collected in a smaller range than the size of the light incident end of optical waveguide 112 (for example, in a case of using an optical fiber, its core diameter (i.e., the diameter of the core)).

Fluorescent light reflection filter 110 is an element for separating the excitation light having entered from light collecting element 104, and light having been radiated from an after-mentioned diamond (i.e., fluorescent light) from each other. For example, fluorescent light reflection filter 110 is a short-pass filter that allows light having a wavelength of a predetermined wavelength or less to travel while cutting light having a wavelength longer than the predetermined wavelength (i.e., reflection), or a bandpass filter that allows light within a predetermined wavelength range to travel while cutting light out of the predetermined wavelength range (i.e., reflection). In general, the excitation light has a shorter wavelength than the fluorescent light does. Accordingly, such a configuration is preferable. Preferably, fluorescent light reflection filter 110 is a dichroic mirror having such a function.

Optical waveguide 112 includes a medium that transmits light, and bi-directionally transmits light. That is, excitation light having entered a first end disposed closer to excitation light generation part 106 is transmitted to a second end disposed closer to sensor part 120. Meanwhile, radiated light (i.e., fluorescent light) from a diamond element 116 having entered the second end is transmitted to the first end. Optical waveguide 112 is, for example, an optical fiber. To increase the energy density of the excitation light to be transmitted, it is preferable that the core diameter of the optical fiber be smaller as much as possible. On the other hand, if the core diameter is too small, the efficiency of entrance of light radiated from a light source (i.e., the light emitting element) in a diffused manner into the optical fiber is reduced. Consequently, there is an appropriate core diameter. For example, the core diameter of the optical fiber is about 80 μm or less and 1 μm or more.

Sensor part 120 includes a light collecting element 114, diamond element 116, and an electromagnetic wave irradiation part 118. Diamond element 116 includes the NV center. Light collecting element 114 is disposed in contact with diamond element 116. Light collecting element 114 converges the excitation light output from optical waveguide 112, and irradiates diamond element 116 with the light. An electromagnetic wave irradiation part 118 irradiates diamond element 116 with electromagnetic waves (e.g., microwaves). Electromagnetic wave irradiation part 118 is, for example, a coil formed to include an electrical conductor. The source of electromagnetic waves irradiated from electromagnetic wave irradiation part 118 to diamond element 116 is electromagnetic wave generating part 140. That is, the electromagnetic waves output from electromagnetic wave generating part 140 are radiated as electromagnetic waves EW into the air by transmitting part 144, are received by receiving part 130 (e.g., an antenna), and are transmitted to electromagnetic wave irradiation part 118.

Figure 3:
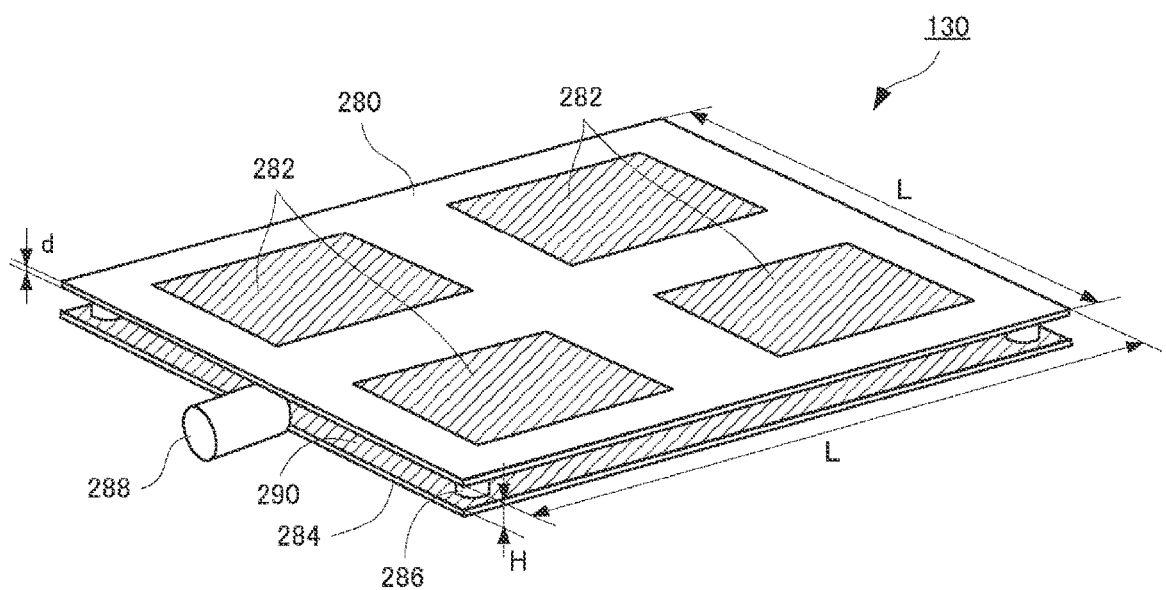
FIG. 3 is a perspective view showing a patch antenna that receives microwaves.

Receiving part 130 is, for example, a patch antenna (i.e., a microstrip antenna) shown in FIG. 3. The patch antenna includes substrates 280 and 284, and a connector 288 for outputting a received signal. Connector 288 is an SMA type coaxial connector, and is connected to electromagnetic wave irradiation part 118 via a coaxial cable or the like. Substrates 280 and 284 are arranged at a predetermined interval H with spacers 286 at four corners. Each of substrates 280 and 284 is a substrate that is made of an electrical insulating member and has a predetermined thickness d. The plane of each substrate is a square having each side with a length L. Four conductive members 282 are disposed apart from each other on a surface between the two flat surfaces of substrate 280 that does not face substrate 284. Each conductive member 282 is a square. The four sides are in parallel with the corresponding four sides of substrate 280. Four conductive members 282 are four-fold symmetrical, as a whole, centered on the center point of substrate 280 as the center of rotation. A conductive member 290 is disposed on the entire surface of a surface between the two surfaces of substrate 284 that faces substrate 280.

Four conductive members 282 are connected to a signal line of connector 288 in parallel. A conductive member 290 of substrate 284 is connected to a shield (i.e., ground) of connector 288. Conductive member 290 is a ground surface of the patch antenna. Accordingly, the patch antenna has a directionality in a direction perpendicular to the flat surface of substrate 280. Microwaves received by receiving part 130 are transmitted to electromagnetic wave irradiation part 118 through a transmission path (i.e., a coaxial cable), and are irradiated to diamond element 116. In a case where microwaves of a frequency of about 2.87 GHz are received, substrates 280 and 284 are fabricated of, for example, a substrate made of glass epoxy resin (e.g., FR4) with L=120 (mm) and t=1 (mm), and are disposed at an interval of H=5.2 (mm). The patch antenna can be formed to have a planar shape. Accordingly, through use of the patch antenna as receiving part 130, the design flexibility is improved.

Figure 4:
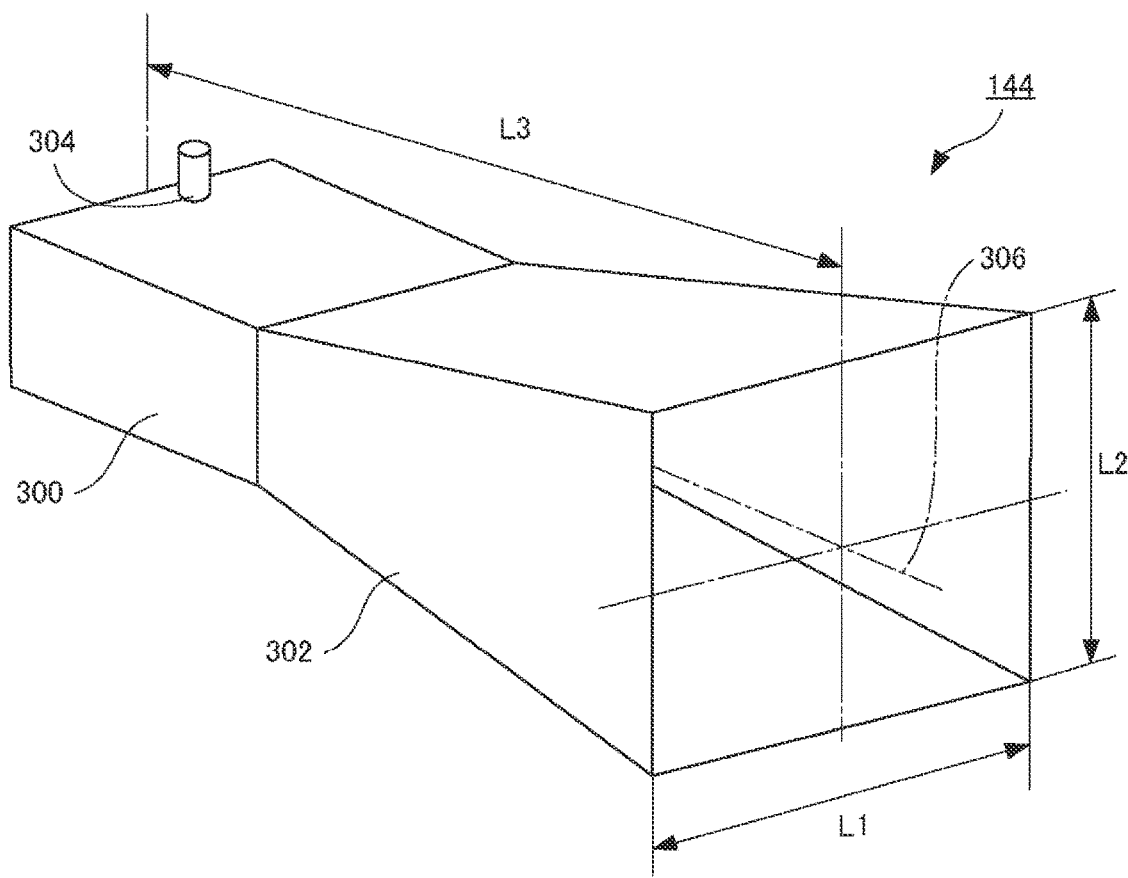
FIG. 4 is a perspective view showing a horn antenna that transmits microwaves.

For example, transmitting part 144 is a waveguide tube horn antenna shown in FIG. 4. The horn antenna includes an adapter part 300, a horn part 302, and a connector 304. Connector 304 is an SMA type coaxial connector, and supplies adapter part 300 with electromagnetic waves (i.e., microwaves) supplied from the outside (i.e., electromagnetic wave generating part 140). Adapter part 300 is a waveguide tube, and is formed of a conductive member (e.g., an aluminum alloy). The shape of a cross-section (hereinafter called a sectional surface) perpendicular to the propagation direction of electromagnetic waves is constant. Electromagnetic waves supplied to adapter part 300 propagate to horn part 302. Horn part 302 is formed of a conductive member (e.g., an aluminum alloy), and is formed to have a flared shape where the sectional surface is gradually widened in order to conform the shape to a free space and suppress reflection. The horn antenna has directionality in the direction of central axis 306. In the horn antenna shown in FIG. 4, an opening of horn part 302 has a rectangular shape having a predetermined width L1 and a predetermined height L2, and the overall length of adapter part 300 and horn part 302 is a predetermined length L3. In a case of radiating microwaves with a frequency of about 2.87 GHz, those with L1=110 (mm), L2=87.9 (mm), and L3=254 (mm) can be used. By adopting the horn antenna as transmitting part 144, electromagnetic waves can be transmitted to receiving part 130 (i.e., the patch antenna) with good directionality.

Note that the shape of horn part 302 may be a flared shape where the sectional surface is gradually widened, and be any shape without limitation to the shape shown in FIG. 4. For example, the shape of horn part 302 may be a conical shape, a pyramid shape where the height L2 of the opening is equal to the height of adapter part 300, or a pyramid shape where the width L1 of the opening is equal to the width of adapter part 300. Adapter part 300 and horn part 302 may be integrally formed, or configured detachable from each other. For example, adapter part 300 and horn part 302 may respectively have flanges at portions connected to each other, and the flanges may be detachably connected to each other with screws or the like. The electromagnetic wave output port (i.e., the opening) of horn part 302 is required to be disposed toward receiving part 130 (i.e., receiving part 130 is positioned on the extended line of central axis 306 of the horn antenna). The closest portion between horn part 302 and the patch antenna is preferably apart by 50 cm or more, more preferably apart by 1 m or more, further preferably apart by 5 m or more, and still further preferably apart by 10 m or more. In a case of 50 cm or less, with receiving part 130 being on a high voltage side with 33 kV or more (e.g., a high-voltage facility or the like), discharge tends to occur between the high voltage side and horn part 302. Accordingly, this case is not preferable. In a case of being apart by 30 m or more, the power of microwaves radiated from transmitting part 144 does not reach receiving part 130. Accordingly, this case is not preferable.

Figure 5:
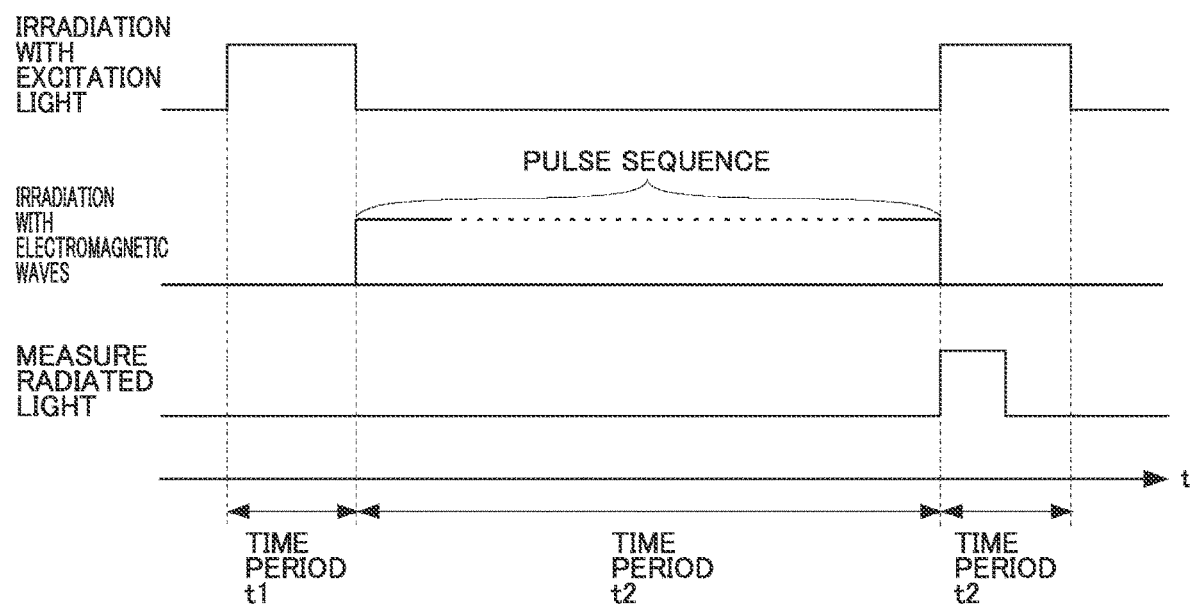
FIG. 5 is a sequence diagram showing the irradiation timing of excitation light and electromagnetic waves during measurement using the diamond sensor unit shown in FIG. 2, and shows the measurement timing of radiated light.

The irradiation of diamond element 116 with the excitation light and the electromagnetic waves is controlled by control part 142, and is performed at timing as shown in FIG. 5, for example. That is, control part 142 controls light emitting element 102 so as to output excitation light at predetermined timing for a predetermined time (e.g., a time period t1). Control part 142 controls electromagnetic wave generating part 140 so as to output electromagnetic waves at predetermined timing for a predetermined time (e.g., a time period t2). A pulse sequence in time period t2 may be an appropriate one in accordance with the diamond to be used (for example, the degree of bearing alignment of a plurality of NV centers), an observed signal (i.e., a signal affected by the spin state at the NV center) and the like. Accordingly, the electromagnetic waves are temporally and spatially combined with the excitation light, and diamond element 116 is irradiated with them. As described later, control part 142 captures, at predetermined timing (e.g., in a time period t3), an output signal of a light detection part 126 that is to be input, and stores the signal in the storage part.

Figure 6:
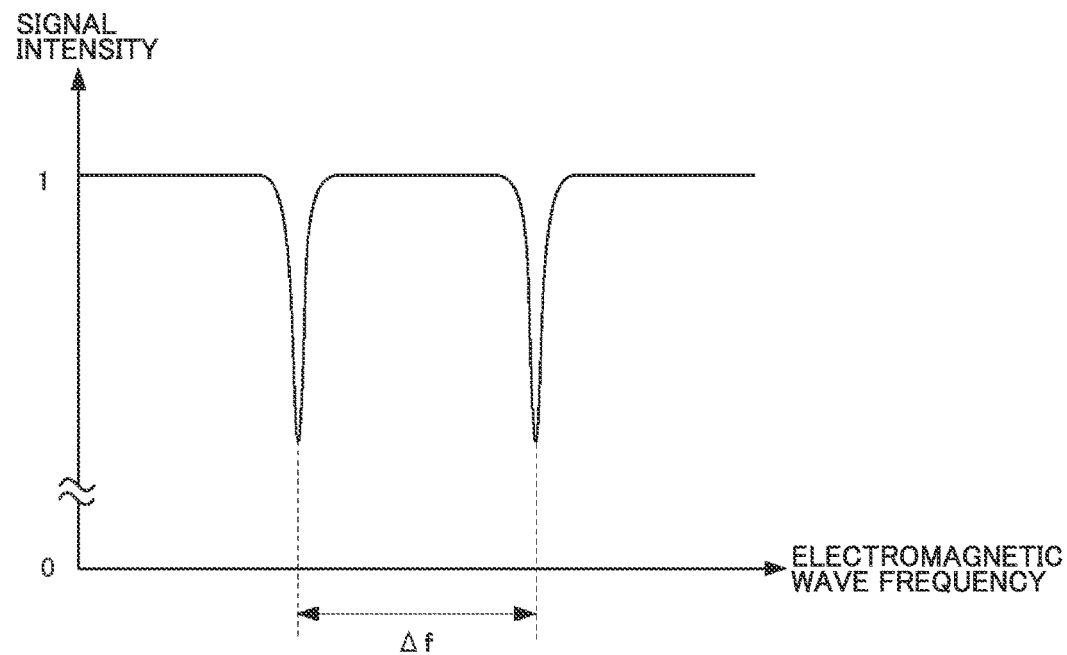
FIG. 6 is a graph schematically showing the relationship between the observed signal intensity (i.e., radiated light intensity), and the frequency of electromagnetic waves (i.e., microwaves).

The NV center has a structure where a carbon (C) atom in a diamond crystal is replaced with a nitrogen (N) atom, a carbon atom that should be adjacently present is absent (i.e., a hole (V)). The NV center transitions from the ground state to the excited state by green light having a wavelength of about 490 to 560 nm (e.g., laser light of 532 nm), and emits red light having a wavelength of about 630 to 800 nm (e.g., fluorescent light of 637 nm) and returns to the ground state. In a state where one electron is captured (i.e., NV$^-$), the NV center forms a spin-triplet state with magnetic quantum numbers $m_s$ of −1, 0, and +1, and possible presence of a magnetic field separates the energy level in a state of $m_s=\pm 1$ in accordance with the magnetic field intensity (i.e., Zeeman separation). The NV center is irradiated with microwaves of about 2.87 GHz, a state of $m_s=0$ is caused to transition to a state of $m_s=\pm 1$ (i.e., electron spin resonance), subsequently irradiated with green light, and excitation is caused. Thus, the transition returning to the ground state includes transition without radiation of light (i.e., fluorescent light). Accordingly, the intensity of radiated light to be observed decreases. Consequently, in the ESR (Electron Spin Resonance) spectrum, a valley (i.e., falling of the signal) is observed. By control part 142 controlling light emitting element 102 and electromagnetic wave generating part 140 as described above, a spectrum as shown in FIG. 6 is measured, for example. The observed Δf depends on the magnetic field intensity at the position of diamond element 116.

As for specific measurement of the spectrum, the measurement is performed as follows. That is, light radiated form diamond element 116 in a diffused manner (i.e., fluorescent light) is collected by light collecting element 114, and enters, as parallel light, the second end of optical waveguide 112. The light input into optical waveguide 112 (i.e., fluorescent light) is transmitted through optical waveguide 112, and is output from the first end of optical waveguide 112. The light output from the first end of optical waveguide 112 (i.e., fluorescent light) is reflected by fluorescent light reflection filter 110, passes through LPF 122, is collected by a light collecting element 124, and enters light detection part 126. Accordingly, the light having a frequency in accordance with the magnetic field at the position where diamond element 116 is disposed is detected by light detection part 126. Light detection part 126 generates an electric signal in accordance with the incident light, and outputs the signal. Light detection part 126 is, for example, a photodiode. The output signal of light detection part 126 is obtained by control part 142.

LPF 122 is a long-pass filter, allows light having a wavelength that is a predetermined wavelength or more to pass while cutting light having wavelengths shorter than the predetermined wavelength (e.g., reflection). The radiated light from diamond element 116 is red light, which passes through LPF 122. However, since the excitation light has a shorter wavelength than the red light, the excitation light does not pass through LPF 122. Thus, the excitation light radiated from light emitting element 102 is prevented from being detected by light detection part 126, from serving as noise, and from reducing the detection sensitivity of the radiated light (i.e., fluorescent light) from diamond element 116.

As described above, control part 142 irradiates diamond element 116 with excitation light, and sweeps the frequency of electromagnetic waves in a predetermined range and irradiates diamond element 116 with the light, thus allowing the light (e.g., fluorescent light) radiated from diamond element 116 to be obtained as the electric signal output from light detection part 126. Based on observed Δf (i.e., the value depending on the magnetic field intensity at the position of diamond element 116), the magnetic field intensity at the position of diamond element 116 can be calculated. That is, diamond sensor unit 100 functions as a magnetic sensor. Note that diamond sensor unit 100 can be used as a sensor for detecting not only the magnetic field (i.e., magnetic field) but also physical quantities related to the magnetic field, e.g., the magnetization, electric field, voltage, current, temperature, pressure, etc.

Electromagnetic waves with which diamond element 116 is to be irradiated are caused to propagate in the air through transmitting part 144 and receiving part 130 (i.e., wirelessly), and are transmitted to electromagnetic wave irradiation part 118. Consequently, even in case a high voltage and high current are caused by electrical discharge in a high-voltage facility or the like where sensor part 120 is disposed, the devices for transmitting electromagnetic waves (i.e., electromagnetic wave generating part 140 and control part 142) are not damaged.

In a case where an optical fiber is adopted as optical waveguide 112, diamond element 116, which is the main part of the sensor, and light collecting element 114 are formed of an electrical insulator, and occurrence of damage due to electrical discharge or the like can be suppressed accordingly, even with sensor part 120 and the second end of optical waveguide 112 being installed in a high-voltage facility or the like. Consequently, the magnetic field and the like can be safely measured in a high-voltage environment by diamond sensor unit 100. Excitation light generation part 106 and light receiving part 128 can be disposed remote from the high-voltage environment via optical waveguide 112, and electromagnetic wave generating part 140 and transmitting part 144 can also be disposed remote from the high-voltage environment. Consequently, the magnetic field and the like can be remotely measured by diamond sensor unit 100. The distance (i.e., separation distance) between transmitting part 144, excitation light generation part 106 and light receiving part 128, and sensor part 120 is preferably 10 cm or more, and is more preferably 50 cm or more. The separation distance is further preferably 1 m or more, still further preferably 5 m or more, and yet more preferably 10 m or more.

Sensor part 120 includes light collecting element 114 disposed between diamond element 116 and optical waveguide 112. Accordingly, the losses of the excitation light and the radiated light can be reduced, and the detection accuracy can be improved. Fluorescent light reflection filter 110, which separates the excitation light and the radiated light from each other, is provided, and transmission of the excitation light and the radiated light can be performed through a single medium (e.g., optical waveguide 112). Accordingly, as described later, in comparison with a case where two media for respectively transmitting the excitation light and the radiated light are provided, the number of components can be reduced, which can achieve a simple configuration.

Second Embodiment

Figure 7:
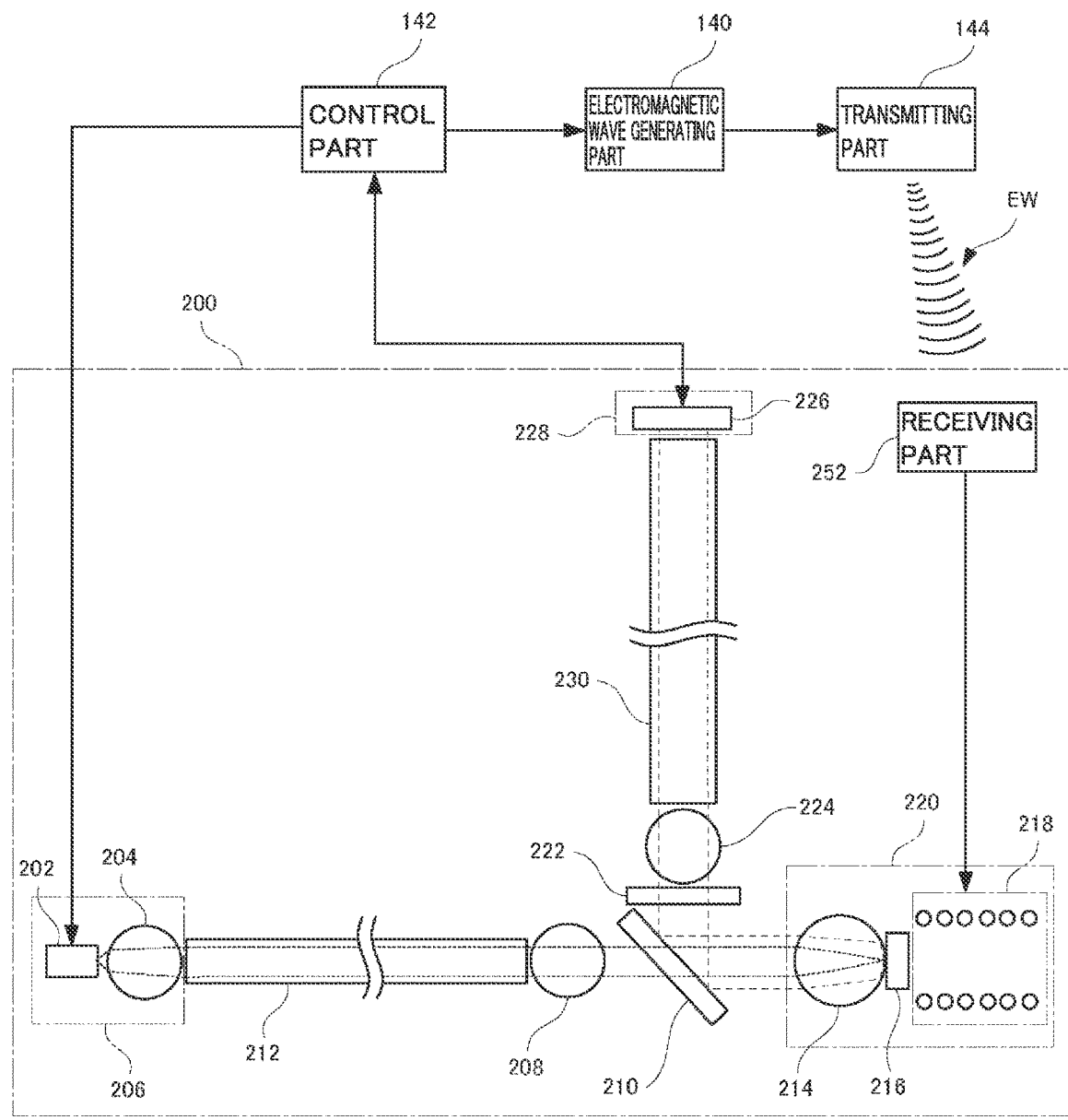
FIG. 7 is a schematic diagram showing a schematic configuration of a diamond sensor unit according to a second embodiment of the present disclosure.

In the first embodiment, the light (i.e., the excitation light and the radiated light) is bi-directionally transmitted using single optical waveguide 112. In a second embodiment, optical waveguides for respectively transmitting the excitation light for and the radiated light from a diamond element 116 are used. Referring to FIG. 7, a diamond sensor unit 200 according to the second embodiment of the present disclosure includes an excitation light generation part 206, a first optical waveguide 212, a light collecting element 208, a fluorescent light reflection filter 210, a sensor part 220, an LPF 222, a light collecting element 224, a second optical waveguide 230, a light receiving part 228, and a receiving part 252. Similar to the first embodiment, an electromagnetic wave generating part 140, control part 142, and transmitting part 144 are disposed outside of diamond sensor unit 200.

Excitation light generation part 206 includes a light emitting element 202, and a light collecting element 204. Sensor part 220 includes a light collecting element 214, diamond element 216, and an electromagnetic wave irradiation part 218. Light receiving part 228 includes a light detection part 226. Light emitting element 202, light collecting element 204, fluorescent light reflection filter 210, light collecting element 214, diamond element 216, electromagnetic wave irradiation part 218, LPF 222, light detection part 226, and receiving part 252 respectively correspond to light emitting element 102, light collecting element 104, fluorescent light reflection filter 110, light collecting element 114, diamond element 116, electromagnetic wave irradiation part 118, LPF 122, light detection part 126, and receiving part 130 shown in FIG. 2, and similarly function. Consequently, these are briefly described.

Similar to the first embodiment, under control by control part 142, light emitting element 202 generates excitation light for exciting the diamond NV center. For example, control part 142 supplies, at predetermined timing, light emitting element 202 with a voltage for causing light emitting element 202 to emit light. The excitation light is green light. Preferably, the excitation light is laser light. Preferably, light emitting element 202 is a semiconductor laser. Light collecting element 204 collects the excitation light output from light emitting element 202 in a diffused manner, and inputs the light into a light incident end of first optical waveguide 212.

First optical waveguide 212 includes a medium for transmitting light. Unlike optical waveguide 112 shown in FIG. 2, first optical waveguide 212 transmits the excitation light but does not transmit the radiated light from diamond element 216. That is, the excitation light incident on the first end (i.e., an incident end) of first optical waveguide 212 disposed closer to excitation light generation part 206 is transmitted to the second end (i.e., an output end) disposed closer to sensor part 220, and is output. First optical waveguide 212 is, for example, an optical fiber. The excitation light output from first optical waveguide 212 in a diffused manner is collected by light collecting element 208, and enters, as parallel light, fluorescent light reflection filter 210.

Fluorescent light reflection filter 210 is an element for separating the excitation light having entered from light collecting element 208, and light having been radiated from diamond element 216 (i.e., fluorescent light) from each other. Fluorescent light reflection filter 210 may be a dichroic mirror.

Light collecting element 214 converges the excitation light having passed through fluorescent light reflection filter 210 and entered, and irradiates diamond element 216 with the light. Light collecting element 214 is disposed in contact with diamond element 216. Diamond element 216 includes an NV center. Electromagnetic wave irradiation part 218 irradiates diamond element 216 with electromagnetic waves (e.g., microwaves). Electromagnetic wave irradiation part 218 is, for example, a coil. Electromagnetic waves are generated by electromagnetic wave generating part 140, are radiated as electromagnetic waves EW into the air by transmitting part 144, are received by receiving part 252 (e.g., the patch antenna shown in FIG. 3), and are supplied to electromagnetic wave irradiation part 218. The irradiation of diamond element 216 with the excitation light and the electromagnetic waves is controlled by control part 142, and is controlled at timing as shown in FIG. 5, for example. Accordingly, as described above, red light (i.e., fluorescent light) is radiated from diamond element 216.

The light radiated from diamond element 216 in a diffused manner (i.e., red fluorescent light) is collected by light collecting element 214 as parallel light, and is incident on fluorescent light reflection filter 210. The light (i.e., red fluorescent light) incident on fluorescent light reflection filter 210 is reflected by fluorescent light reflection filter 210, and enters LPF 222. The radiated light (i.e., red fluorescent light) from diamond element 216 that is incident on LPF 222 passes through LPF 222, is collected by light collecting element 224, and enters a first end (i.e., an incident end) of second optical waveguide 230. LPF 222 prevents the excitation light radiated from light emitting element 202 from being detected by light detection part 226, from serving as noise, and from reducing the detection sensitivity of the radiated light (i.e., fluorescent light) from diamond element 216.

Second optical waveguide 230 includes a medium for transmitting light. Second optical waveguide 230 transmits the light (i.e., the radiated light from diamond element 216) entering a first end (i.e., an incident end) from light collecting element 224, to a second end (i.e., an output end) disposed closer to light receiving part 228, and outputs the light. Light output from second optical waveguide 230 is detected by light detection part 226. Light detection part 226 is, for example, a photodiode. The output signal of light detection part 226 is obtained by control part 142.

As described above, similar to the first embodiment, control part 142 irradiates diamond element 216 with excitation light, and sweeps the frequency of electromagnetic waves in a predetermined range and irradiates diamond element 216 with the light, thus allowing the light (e.g., fluorescent light) radiated from diamond element 216 to be obtained as the electric signal output from light detection part 226. Consequently, diamond sensor unit 200 functions as a magnetic sensor. Diamond sensor unit 200 can be used as a sensor for detecting not only the magnetic field but also physical quantities related to the magnetic field, e.g., the magnetization, electric field, voltage, current, temperature, pressure, etc.

Electromagnetic waves with which diamond element 216 is to be irradiated are caused to propagate in the air through transmitting part 144 and receiving part 252 (i.e., wirelessly), and are transmitted to electromagnetic wave irradiation part 218. Consequently, even in case a high voltage and high current are caused by electrical discharge in a high-voltage facility or the like where sensor part 220 is disposed, the devices for transmitting electromagnetic waves (i.e., electromagnetic wave generating part 140 and control part 142) are not damaged.

In a case where the optical fibers are adopted as the two optical waveguides, diamond element 216, which is the main part of the sensor, and light collecting element 214 are formed of an electrical insulator, and occurrence of damage due to electrical discharge or the like can be suppressed accordingly. Consequently, the magnetic field and the like can be safely measured in a high-voltage environment by diamond sensor unit 200. Excitation light generation part 206 and light receiving part 228 can be disposed remote from the high-voltage environment via first optical waveguide 212 and second optical waveguide 230, and electromagnetic wave generating part 140 and transmitting part 144 can also be disposed remote from the high-voltage environment. Consequently, the magnetic field and the like can be remotely measured by diamond sensor unit 200. The distance (i.e., separation distance) between transmitting part 144, excitation light generation part 206 and light receiving part 228, and sensor part 220 is preferably 10 cm or more, and is more preferably 50 cm or more. The separation distance is further preferably 1 m or more, still further preferably 5 m or more, and yet more preferably 10 m or more.

Furthermore, Sensor part 220 includes light collecting element 214 disposed between diamond element 216, and first optical waveguide 212 and second waveguide 230. Accordingly, the losses of the excitation light and the radiated light can be reduced, and the detection accuracy can be improved.

Through use of the two optical waveguides (i.e., first optical waveguide 212 and second optical waveguide 230), the excitation light and the radiated light from diamond element 216 that have wavelengths different from each other can be appropriately transmitted. That is, through use of the optical fibers having core diameters in accordance with the wavelengths, the respectively suitable light collecting optical systems (i.e., light collecting element 204, light collecting element 208, light collecting element 214, and light collecting element 224) can be designed, the light transmission efficiency can be improved, and the measurement accuracy can be improved. In the case of using the optical fibers as the optical waveguides, it is preferable that the core diameter of the optical fiber (i.e., second optical waveguide 230) for transmitting the radiated light from the diamond be larger than the core diameter of the optical fiber (i.e., first optical waveguide 212) for transmitting the excitation light.

As described above, to increase the energy density of the excitation light, it is preferable that the core diameter of the optical fiber used for transmitting the excitation light preferably be small. However, if the core diameter is too small, a loss occurs when light enters the fiber from the light source. Consequently, there is an appropriate degree of the core diameter. Preferably, the core diameter of first optical waveguide 212 is 1 µm or more and 100 µm or less. On the other hand, preferably, the core diameter of the optical fiber for transmitting the radiated light from diamond element 216 is large as much as possible. Note that if the core diameter is too large, the cost increases. Preferably, the core diameter of second optical waveguide 230 is 1 µm or more and 1 mm or less.

Sensor part 120 and receiving part 130 in FIG. 2 are disposed adjacent to the detection target. In a case where the detection target is high-voltage power equipment, power transmission line or the like, it forms an electric field around it by energization. Accordingly, the reception performance of receiving part 130 is affected by it. The same applies to sensor part 220 and receiving part 252 in FIG. 5. To reduce the influences, it is preferable to pay attention to the disposition of receiving part 130 with respect to the electric field, i.e., the disposition of the conductive member of receiving part 130 that functions as the antenna. Specifically, in the case of the patch antenna shown in FIG. 3, it is preferable to dispose receiving part 130 so that conductive members 282 and 290 can be in parallel with the equipotential plane formed by the electrical equipment, power transmission line, etc. Accordingly, during reception of electromagnetic waves by receiving part 130, the influences of the electric field formed by normal operation of the detection target (i.e., the high-voltage power equipment, power transmission line or the like) can be suppressed. Consequently, receiving part 130 can stably receive the electromagnetic waves radiated from transmitting part 144.

If the equipotential plane at the place where receiving part 130 is disposed is planar, conductive members 282 and 290 can be disposed in parallel with the equipotential plane even in the case where substrates 280 and 284 of receiving part 130 are flat plates (e.g., glass epoxy resin substrates) as described above. However, if the equipotential plane is curved, conductive members 282 and 290 cannot be disposed along the curved equipotential plane in the case where substrates 280 and 284 are rigid flat plates. Consequently, it is preferable that the shapes of conductive members 282 and 290, i.e., the shapes of substrates 280 and 284 serving as bases of them, be formed to have shapes curved along the equipotential plane. Note that the equipotential plane of the power equipment, power transmission line and the like can be preliminarily known by a simulation or the like in accordance with the shapes of the conductive members constituting them. If the conductive members deviate from the equipotential plane, it is possible that a failure of equipment occurs; e.g., electric field concentration occurs at a corner of the patch antenna or the like, and serves as a starting point of insulation breakdown, or arc discharge occurs in case abrupt potential change occurs due to thunderstroke or the like.

Figure 8:
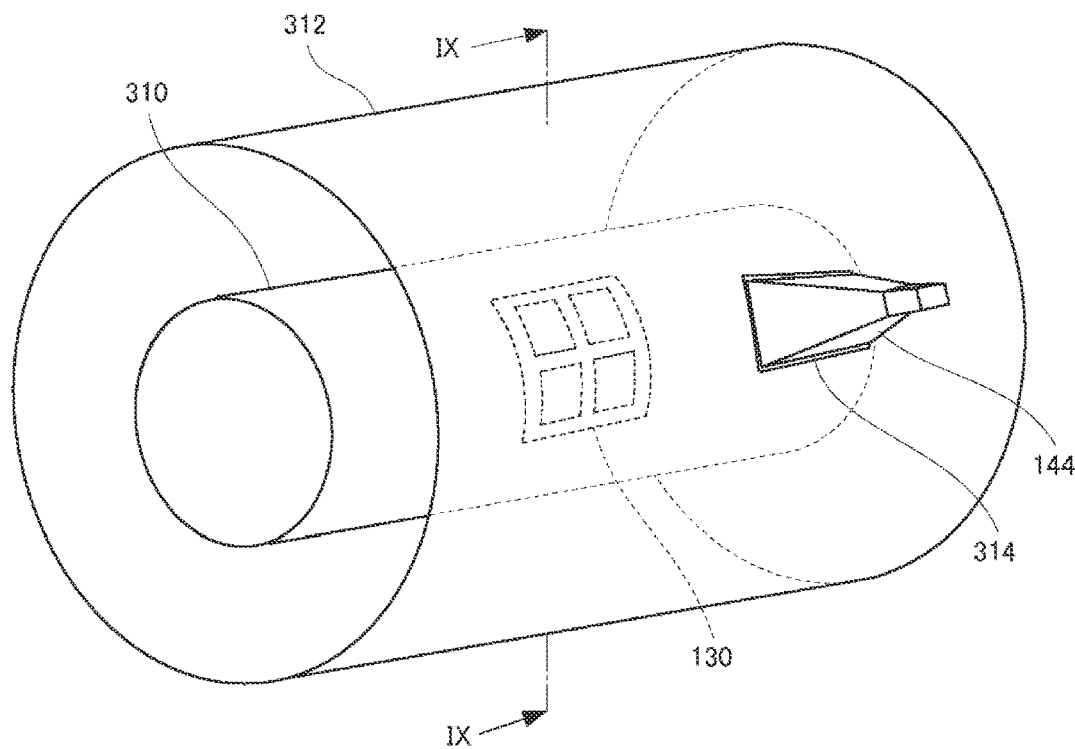
FIG. 8 is a perspective view showing a state where a micro patch antenna and a horn antenna are disposed at a measurement target.

For example, referring to FIG. 8, in a case where sensor part 120 is disposed at a high-voltage power transmission line provided with a central conductor 310 and an external conductor 312, receiving part 130 is disposed adjacent to central conductor 310, for example. Central conductor 310 is formed of a conductive member, and is circumferentially covered with an insulating member. External conductor 312 is formed of a conductive member, and is grounded (i.e., at a ground potential). A space between central conductor 310 and external conductor 312 may be filled with a gas of $SF_6$, $CO_2$ or the like.

Figure 9:
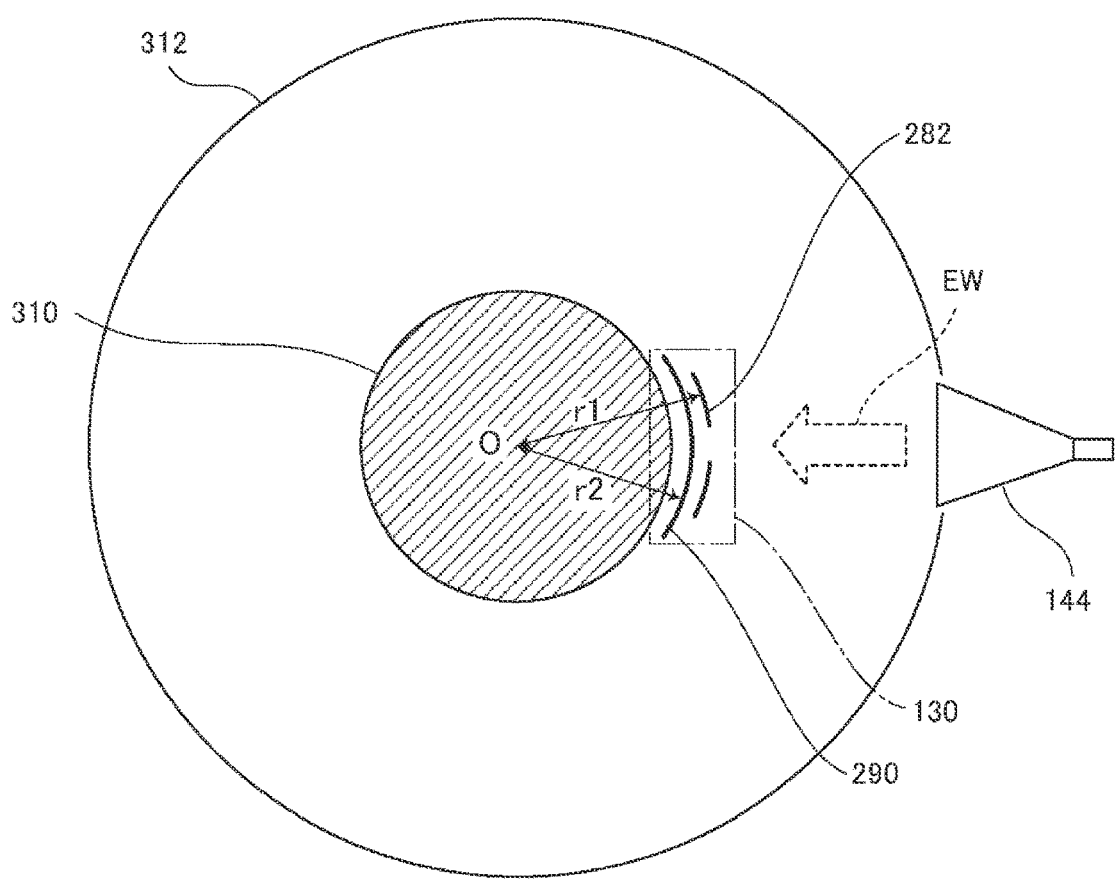
FIG. 9 is a sectional view showing a cross-section of the measurement target, the micro patch antenna, and the horn antenna taken along a plane including line IX-IX shown in FIG. 8.

The equipotential plane formed by central conductor 310 is energized is a cylindrical surface having the same central axis as central conductor 310. Consequently, it is preferable that conductive members 282 disposed on substrate 280 have shapes along a cylindrical surface that is an equipotential plane. Referring to FIG. 9 showing the cross-section of the power transmission line (substrates 280 and 284 are not shown for convenience sake), the cross-section of the equipotential plane (i.e., the equipotential line) has a concentric shape centered on point O, which is the center of central conductor 310. Consequently, it is preferable that the cross-sectional shape of each conductive member 282 be an arc having a radius r1 and centered on point O. Likewise, conductive member 290 formed on substrate 284 also has a shape along a cylindrical surface that is an equipotential plane. That is, it is preferable that the cross-section of conductive member 290 be an arc having a radius r2 and centered on point O.

Preferably, substrates 280 and 284 on which conductive members 282 and 290 are disposed are formed of, for example, glass epoxy resin or the like, to have plate shapes curved along the side surface of central conductor 310. In a case where receiving part 130 is thus formed and disposed at central conductor 310, transmitting part 144 (e.g., the horn antenna) is disposed in an opening 314 provided in the side surface of external conductor 312 so that the radiation direction can be a direction toward the center (i.e., point O) of central conductor 310, and electromagnetic waves EW (e.g., microwaves) may be radiated toward receiving part 130, as shown in FIGS. 8 and 9.

Accordingly, during reception of electromagnetic waves by receiving part 130, the influences of the electric field formed by normal operation (i.e., power supply) of the power transmission line, which is the detection target, can be suppressed. Consequently, receiving part 130 can stably receive the electromagnetic waves radiated from transmitting part 144.

Conductive members 282 and 290 may be formed as thin plates (or thin films). Substrates 280 and 284 on which conductive members 282 and 290 are disposed respectively may be formed of a plastic member. For example, in a case where substrates 280 and 284 are formed of a shape-memory resin (e.g., shape-memory polymer), and the equipotential plane formed by the electrical equipment, electrical wiring or the like is known, substrates 280 and 284 can be deformed to have shapes along equipotential plane by heating substrates 280 and 284. Accordingly, conductive members 282 and 290 can be deformed to have shapes along the equipotential plane, and can be disposed along the equipotential plane.

In the second embodiment, the excitation light and the radiated light from diamond element 216 are separated from each other using fluorescent light reflection filter 210. However, there is no limitation to this. The excitation light and the radiated light from diamond element 216 may be separated from each other using LPF. Specifically, a configuration may be adopted where the optical path for transmitting the excitation light, and the optical path for transmitting the radiated light shown in FIG. 7 are replaced with each other, and an LPF is used instead of fluorescent light reflection filter 210.

The case where the excitation light is incident on one surface of the diamond element including the NV center, and the radiated light from the same surface is measured has been described above. However, there is no limitation to this. In a case where the diamond element including the NV center has a plurality of flat surfaces, a surface irradiated with the excitation light, and a surface where the radiated light is measured may be different from each other. The flat surface means one flat surface having a predetermined area or more. Here, the flat surface of the diamond element including the NV center means one flat surface having an area larger than a circle having a diameter of about 200 µm. For example, in a case where the diamond element is formed to be a rectangular parallelepiped, the excitation light is allowed to enter a first flat surface between two surfaces at 90 degrees, and the radiated light from a second flat surface is collected and detected. A third flat surface in parallel with the first flat surface may be a surface where the radiated light from the detection target is collected. The diamond element is only required to have at least two flat surfaces. There is no limitation to the hexahedron. Any shape may be adopted as that of the diamond element.

The case where the diamond element including the NV center is used as the diamond sensor unit has been described above. However, there is no limitation to this. The diamond element is only required to have a color center with electron spin. The color center with electron spin is a center that forms a spin-triplet state, and emits light by excitation. The NV center is a typical example. Furthermore, it has been known that a color center with electron spin is present also at a silicon-hole center (i.e., Si-V center), germanium-hole center (i.e., Ge-V center), and tin-hole center (i.e., Sn-V center). Consequently, a diamond sensor unit may be configured using a diamond element including any of them instead of the diamond element including the NV center.

Note that depending on the level of the color center, the wavelengths of the excitation light and the radiated light (i.e., fluorescent light), and the frequency of electromagnetic waves causing resonance excitation vary. Among them, the NV center is preferable in terms of the wavelength of light and the frequency of microwaves. In the cases of the Si-V center, Ge-V center, and Sn-V center, millimeter waves (e.g., 30 GHz to 300 GHz) or submillimeter waves (e.g., 300 GHz to 3 THz) that have frequencies higher than the frequency of microwaves (e.g., 1 GHz to 30 GHz) are used as electromagnetic waves with which irradiation is performed. For example, in the case of Si-V center, millimeter waves at about 48 GHz can be used. In the case of Sn-V center, submillimeter waves at about 850 GHz can be used.

The case where the horn antennas (see FIG. 4) are used as transmitting parts 144 and receiving part 252 has been described above. However, there is no limitation to this. Instead of the horn antenna, a patch antenna (e.g., a microstrip antenna) may be used. Through use of the patch antenna, millimeter waves, and submillimeter waves can be transmitted, and a sensor that uses the Si-V center, Ge-V center, Sn-V center or the like can be achieved.

Preferably, the optical waveguide has a two-or-more-layered coaxial structure that includes a core portion through which light passes, and a portion that is made of a material having an refractive index different from that of the core portion and is formed around the core. The core portion is not necessarily made in a form densely filled with a medium for transmitting light. Since the space itself can transmit light, the core may be hollow. Preferably, the optical waveguide is an optical fiber having a core diameter of 1 µm or more and 80 µm or less. This is because through use of the optical fiber, laser light can be relatively easily introduced to a desired position, and the diffusion at the output end of the optical fiber can be suppressed.

The light collecting element is only required to be formed of a material having a function of collecting light. For example, the element may be a lens formed of a silicon-oxide-based material (e.g., glass; an additive other than silicon oxide may be contained), or a material having a diffractive function. Preferably, the light collecting element is a lens that allows light to pass and uses a refractive phenomenon. A spherical lens, a hemispherical lens, and a Fresnel lens are preferable. In particular, in terms of the relationship between the refractive index and the spherical shape, a lens having a focal point of parallel light on a spherical surface is more preferable. This is because through use of such a lens, adjustment of the optical focal point and the optical axis becomes significantly simple, and the amount of light can be utilized as much as possible.

Preferably, in a case where the sensor part is disposed in a high-voltage environment, the optical waveguide (e.g., the optical fiber) for transmitting the excitation light and the radiated light from the diamond is disposed through insulating glass. Accordingly, the excitation light generation part and the light receiving part can be insulated from a high voltage, the devices used in the excitation light generation part and the light receiving part can be protected.

The electromagnetic wave irradiation part is not limited to a coil-shaped one, and may be linear electric wiring as described later. In this case, the diamond element may be disposed on the surface or an end of the transmission path (e.g., the conductive member) for transmitting electromagnetic waves (e.g., microwaves or millimeter waves). Accordingly, the NV center of the diamond can be accurately irradiated with electromagnetic waves.

Preferably, in a case of detecting temporal change in varying magnetic field and the like with respect to AC power using the diamond sensor unit described above, the NV center of the diamond element is excited and subsequently returns from the light radiating state to the original state (i.e., the state before excitation). To achieve this, it is preferable that spin coherence time T2 of the diamond element be short. Preferably, for example, spin coherence time T2 of the diamond element is less than 50 μsec. Note that the detection sensitivity is proportional to $(T2)^{-1/2}$. Accordingly, the smaller T2 is, the lower the detection sensitivity is. Consequently, when abrupt change in magnetic field variation is detected, for example, when pulse shape variation in magnetic field is detected, it is conceivable that spin coherence time T2 of the diamond element is made short as much as possible at the expense of the detection sensitivity.

Preferably, to reduce the spin coherence time, the diamond element contains impurities. In consideration of the fact that the smaller T2 is, the lower the detection sensitivity is, for example, it is preferable that the total hydrogen concentration in the diamond is higher than 0 ppm, and 1 ppm or less. Preferably, all the $NVH^-$ concentration, CH concentration, and $CH_2$ concentration in the diamond are higher than 0 ppm, and 1 ppm or less. Here, the concentration (ppm unit) represents the ratio of the number of atoms.

Note that in the first embodiment, diamond sensor unit 100 may include transmitting part 144. Likewise, in the second embodiment, diamond sensor unit 200 may include transmitting part 144.

Example 1

Figure 10:
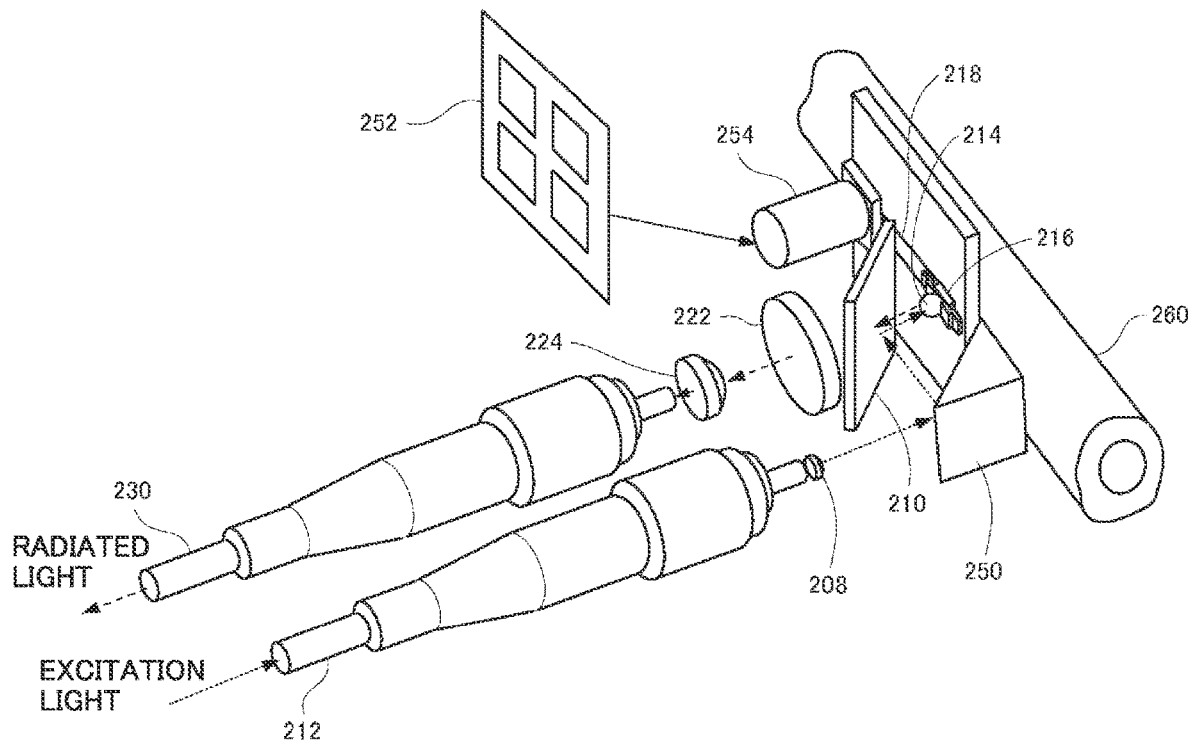
FIG. 10 is a perspective view showing an Example of the second embodiment (see FIG. 7).

Hereinafter, according to an Example, the effectiveness of the present disclosure is described. FIG. 10 shows the Example of the configuration shown in FIG. 7. In FIG. 10, components corresponding to the configuration elements shown in FIG. 7 are respectively assigned with symbols identical to those in FIG. 7.

Step-index multimode optical fibers are used as first optical waveguide 212 and second optical waveguide 230. First optical waveguide 212 has a core diameter of 50 μm, and an NA (i.e., numerical aperture) of 0.2. Second optical waveguide 230 has a core diameter of 400 μm, and an NA of 0.5. A rectangular parallelepiped diamond of 3 mm×3 mm×0.3 mm is used as diamond element 216. A spherical lens having a diameter of 2 mm is used as light collecting element 214. Light collecting element 214 is brought into contact with a surface (i.e., a flat surface of 3 mm×3 mm) of diamond element 216 and is fixed. In the optical system for transmitting the excitation light, a triangular prism 250 is disposed in addition to light collecting element 208 and fluorescent light reflection filter 210, thus configuring a collimating optical system. Thus, adjustment is performed so that the excitation light can enter the center of light collecting element 214.

Figure 11:
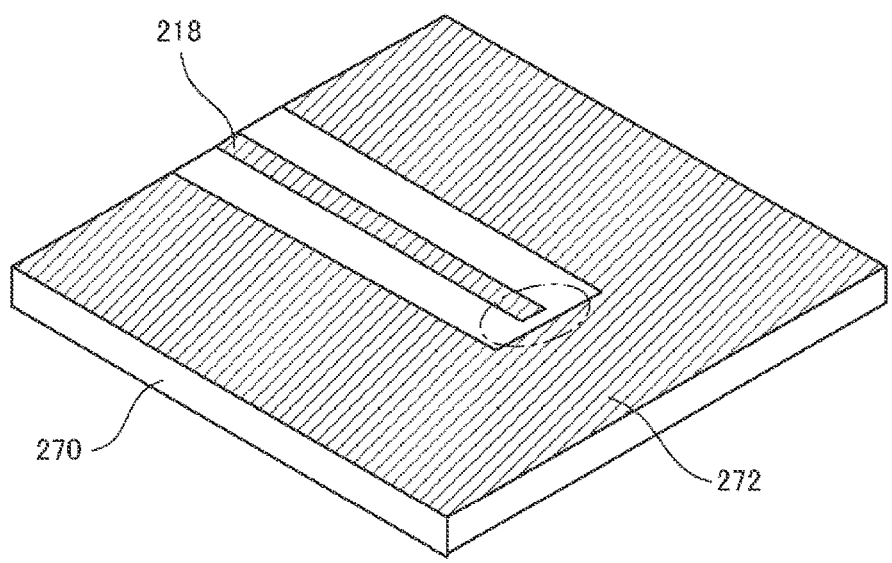
FIG. 11 is a perspective view showing an electromagnetic wave irradiation part that includes a coplanar line.

The coplanar line shown in FIG. 11 is used as electromagnetic wave irradiation part 218. A U-shape is cut out from copper foil 272 formed on a surface of a glass epoxy substrate 270 with each side of about 2 cm, thus forming, at the center, electromagnetic wave irradiation part 218 that is main wiring having a width of 1 mm. Diamond element 216 was fixed at a first end (i.e., a region indicated by a chain-line ellipse in FIG. 11) of electromagnetic wave irradiation part 218 that faced copper foil 272. Accordingly, the NV center of diamond element 216 was allowed to be accurately irradiated with microwaves. The second end of electromagnetic wave irradiation part 218 where diamond element 216 was not disposed was connected to a connector 254 in FIG. 10.

The microwaves were generated by a remotely provided microwave generation device, transmitted in the air, and received by receiving part 252 (see FIG. 10). The horn antenna shown in FIG. 4 was used as transmitting part 144 for radiating microwaves toward receiving part 252. The dimensions were L1=110 (mm), L2=87.9 (mm), and L3=254 (mm), and the gain was 10 dB. A patch antenna (a frequency of 2.873 GHz, and a maximum gain of about 10 dBi) shown in FIG. 3 was used as receiving part 252. Substrates 280 and 284 were glass epoxy resin substrates (L=120 (mm), t=1 (mm)), and are disposed at an interval of H=5.2 (mm). Microwaves received by receiving part 252 were transmitted to connector 254 through a transmission path (i.e., a coaxial cable), and were irradiated to diamond element 216 from electromagnetic wave irradiation part 218.

A PIN-AMP (i.e., a photodiode IC including a linear current amplifier circuit) is used as light detection part 226. The PIN-AMP used here has a photodiode sensitivity wavelength range of 300 to 1000 nm and a maximum sensitivity wavelength of 650 nm, and amplifies the photocurrent generated by the photodiode by 1300 times, and outputs the amplified signal.

Light collecting element 214, diamond element 216, and electromagnetic wave irradiation part 218, which constitute the sensor part, are disposed adjacent to electrical wiring 260. An alternating current (50 Hz or 60 Hz, and 30 A) is caused to flow through electrical wiring 260. The thus caused varying magnetic field is adopted as a detection target. The maximum value of the magnetic field formed at the sensor part by the alternating current is about 0.3 μT. The power of microwaves radiated from the horn antenna is made constant (30 dBm (=1 W)), the distance D between the sensor part and the horn antenna that radiates microwaves is changed, and measurement is performed. The results are shown in FIGS. 12A to 12C and 13. In each case, both the sensor part and the receiving part were disposed at the same distance D from the horn part.

Figure 12A:
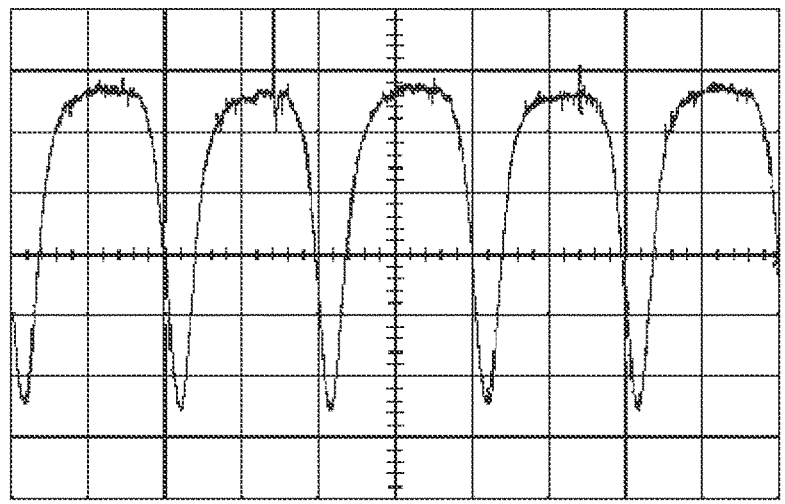
FIG. 12A is a graph showing an experimental result.
Figure 12B:
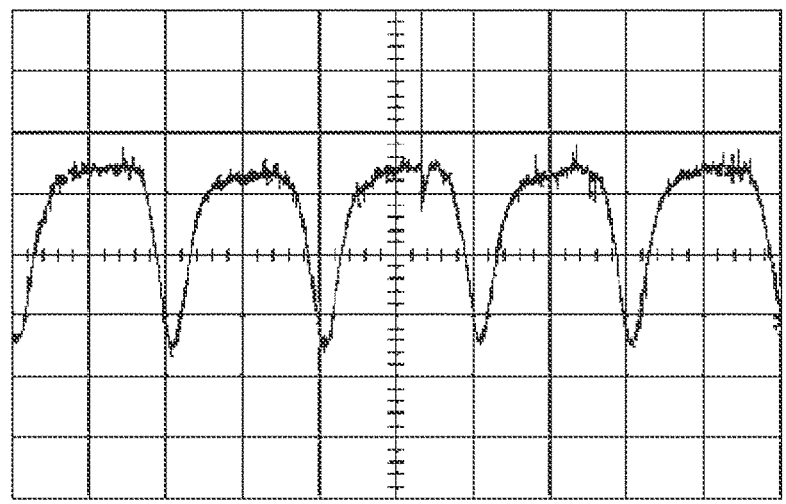
FIG. 12B is a graph showing an experimental result.
Figure 12C:
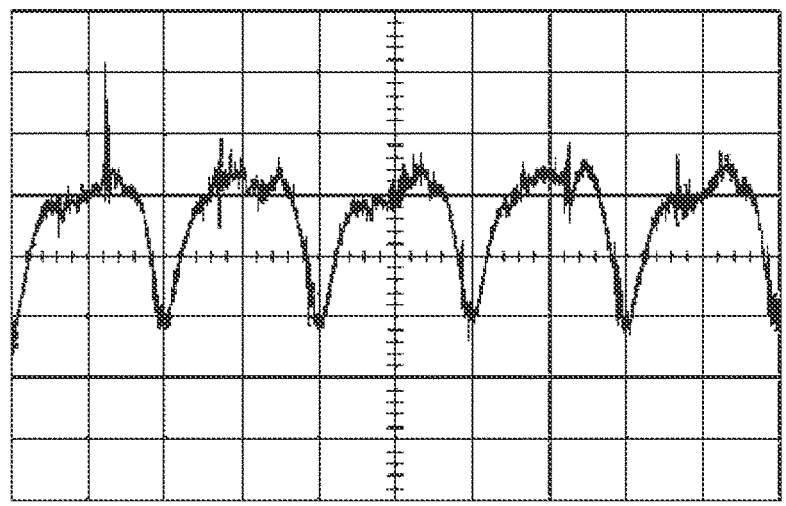
FIG. 12C is a graph showing an experimental result.
Figure 13:
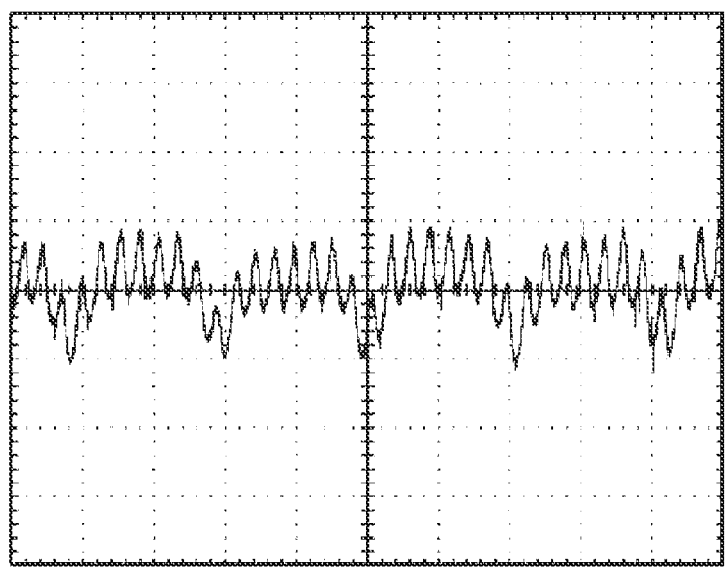
FIG. 13 is a graph showing an experimental result.

FIGS. 12A to 12C show the signals detected by the PIN-AMP in a state where a 50 Hz alternating current (30 A) is caused to flow through electrical wiring 260. FIGS. 12A to 12C show measurement results with D=2.8 (m), D=4 (m), and D=5 (m), respectively. In each of them, a scale on the ordinate axis indicates 10.0 mV, and a scale on the abscissa axis indicates 5 ms. FIG. 13 shows the signal detected by the PIN-AMP in a state where a 60 Hz alternating current (30 A) is caused to flow through electrical wiring 260, and D=10 (m). A unit scale on the ordinate axis indicates 10.0 mV, and a unit scale on the abscissa axis indicates 4 ms.

As can be seen in FIGS. 12A to 12C and 13, the detected signal decreases with increase in distance D of microwave radiation. However, even when relatively weak microwaves of about 1 W were radiated from a position apart from the sensor part by about 10 m, the change in magnetic field formed by the alternating current were sufficiently detected. The detection signals shown in FIGS. 12A to 12C vary at the AC frequency of 50 Hz. The detection signal shown in FIG. 13 varies at the AC frequency of 60 Hz. While the microwaves are attenuated depending on the distance, the power of microwaves to be radiated, the gain of radiation antenna, the gain of reception antenna and the like may be adjusted in consideration of the detection limit (i.e., the lower limit value of the power) of the adopted light detection part, and the radiation distance. In a case where the receiving part was disposed in a high-voltage environment with 10 kV with distance D of 5 cm, electrical discharge occurred at corners of the horn antenna and the receiving part, and measurement was not performed. When distance D was 30 m, the power of microwaves did not arrive. The change in signal in accordance with the change in magnetism (i.e., the change in magnetism formed by alternating current flowing through electrical wiring 260) was not measured. In cases where distance D was 50 cm and 1 m, the signal intensities were five times and four times of the signal intensity in FIG. 12A. Here, the signal intensity means the difference between the maximum value and the minimum value obtained by averaging the noise. The signal intensity shown in FIG. 12A was the difference between the maximum value and the minimum value obtained by averaging the noise with respect to the data in FIG. 12A. As described above, when distance D was 30 m, the power of microwaves did not arrive, no signal was detected. Accordingly, it is preferable that distance D be small. However, the signal intensity does not depend only on the power of microwaves. Accordingly, if distance D was small to a certain extent, the signal intensity had a sufficient value, and showed a saturated tendency. Consequently, it was confirmed that when the distance between the horn antenna (specifically, the horn part) and the sensor part (specifically, the receiving part) was 50 cm or more and 10 m or less, the diamond sensor unit achieved measurement, which was favorable.

In the above description, the coplanar line was formed on the substrate with each side of about 2 cm. Alternatively, a rectangular substrate with each side of about 5 cm or less may be used.

The present disclosure has thus been described above by describing the embodiments. The aforementioned embodiments are only examples. The present disclosure is not limited to only the embodiments described above. The scope of the present disclosure is indicated by each claim among the claims in consideration of the representation of the detailed description of the invention, and encompasses the meanings equivalent to the words described therein, and all the changes within the scope.

REFERENCE SIGNS LIST 100, 200 Diamond sensor unit
102, 202 Light emitting element
104, 114, 124, 204, 208, 214, 224 Light collecting element
106, 206 Excitation light generation part
110, 210 Fluorescent light reflection filter
112 Optical waveguide
116, 216 Diamond element
118, 218 Electromagnetic wave irradiation part
120, 220 Sensor part
122, 222, 908 LPF
126, 226 Light detection part
128, 228 Light receiving part
130, 252 Receiving part
140 Electromagnetic wave generating part
142 Control part
144 Transmitting part
212 First optical waveguide
230 Second optical waveguide
250 Triangular prism
254, 288, 304 Connector
260 Electrical wiring
270 Glass epoxy substrate
272 Copper foil
280, 284, 912, 914, 916 Substrate
282, 290 Conductive member
286 Spacer
300 Adapter part
302 Horn part
306 Central axis
310 Central conductor
312 External conductor
314 Opening
900 LED
902 SPF
904 Diamond
906 Lens
910 Photodiode
d Thickness
EW Electromagnetic waves
H Interval
L, L3 Length
L1 Width
L2 Height

The invention claimed is:

1. A diamond sensor unit, comprising:
a diamond having a color center with electron spin;
an excitation light irradiation part configured to irradiates the diamond with excitation light;
a first patch antenna configured to receives electromagnetic waves;
an electromagnetic wave irradiation part provided separately from the first patch antenna and configured to irradiates the diamond with the electromagnetic waves received by the first patch antenna via a transmission path;
a detection part configured to detects radiated light radiated from the color center of the diamond after the diamond is irradiated with the excitation light and the electromagnetic waves; and
an optical waveguide configured to transmits the excitation light and the radiated light.

2. The diamond sensor unit according to claim 1, further comprising a horn antenna or a second patch antenna that transmits the electromagnetic waves to be received by the first patch antenna,
wherein the horn antenna transmits microwaves as the electromagnetic waves, and
the second patch antenna transmits microwaves, millimeter waves, or submillimeter waves as the electromagnetic waves.

3. The diamond sensor unit according to claim 1,
wherein the first patch antenna includes a plate-shaped conductive member that receives the electromagnetic waves, and is disposed in an electrical equipment or an electrical wiring that is a detection target, and
the first patch antenna is disposed so that the conductive member is in parallel with an equipotential plane formed by the detection target.

4. The diamond sensor unit according to claim 3,
wherein the equipotential plane has a curved shape, and
the first patch antenna is disposed so that the conductive member is disposed along the curved shape.

5. The diamond sensor unit according to claim 1,
wherein the first patch antenna includes a plate-shaped conductive substrate that receives the electromagnetic waves, the first patch antenna having directionality in a direction perpendicular to the surface of the plate-shaped conductive substrate.

\* \* \* \* \*